W. D. TITUS.
Axle-Lubricator.
No. 14,261.
Patented Feb. 12, 1856.
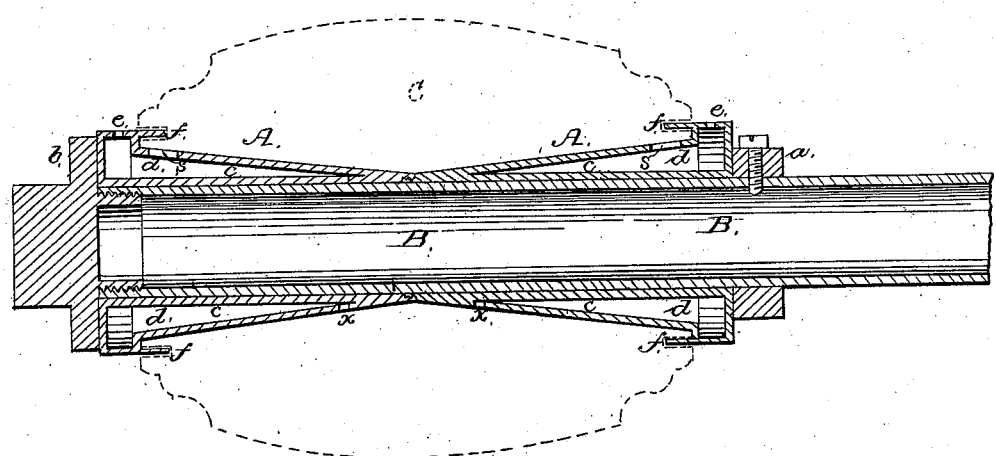

UNITED STATES PATENT OFFICE.

WM. D. TITUS, OF BROOKLYN, NEW YORK.

OIL-BOX FOR AXLES WITH CONICAL JOURNALS.

Specification of Letters Patent No. 14,261, dated February 12, 1856.

*To all whom it may concern:*

Be it known that I, WM. D. TITUS, of the city of Brooklyn, in the county of Kings and State of New York, have invented a certain new and useful Improvement in Axle or Journal Lubricating Arrangements, of which the following is a full, clear, and exact description, reference being had to the accompanying drawing, which forms part of this specification and which represents a double conical stationary lubricating-bearing on a fixed axle or shaft, in longitudinal section, as suitable to a wagon or carriage axle arrangement.

My improvement has reference to that description of lubricating bearings in which the bearing is of single or double conical form and the oil or grease is spread upward or along it, from the smaller diameter to the larger one, by the centrifugal effect of the revolving cone within the fixed box or that of the revolving body on the fixed cone as the case may be. These conical bearings have been variously constructed and applied but more particularly to carriage or wagon axles, and in a double conical form or arrangement, such as represented in the accompanying drawing, they are well adapted for that purpose as they steady the run of the wheel laterally and insure an easy run of the hub on them by the more certain universal spreading of the oil or grease along the entire bearing in a slow spiral manner (upwardly as well as round) than can be obtained in straight bearings which are more apt to work the oil or grease toward the outer edges of the bearing, or ends of same, thereby occasioning irregular lubrication and great waste of the lubricating material; but great waste of the oil or grease past the ends of the conical bearings also has taken place by reason of their defective construction as regards establishing a free return or circulation of the oil or grease, notwithstanding the many devices, such as spiral passages, grooves, and so forth, which have been provided the bearings, and it has been considered impossible to prevent the oil from gumming or clogging and becoming over-heated by its too long exposure to attrition at one time.

To remedy these defects in the conical bearing, as well as to secure other advantages, is the object of improvement.

In the double conical bearing represented in the accompanying drawing, which is designed for a carriage or wagon axle arrangement, the cones (A) are placed with their smaller ends adjoining, as in former arrangements referred to, on the axle or shaft (B), and the hub (C) of the wheel rotates upon the cones, which, as well as the axle or shaft (B), are stationary. These cones (A) may be held on the axle or shaft by butting against a collar (*a*) at the one end and being locked tight by a nut (*b*) at the other end, which mode of securing them affords facility for turning them should occasion require such as to run the oil or grease out of them and so forth. These cones (A) have an inner cylinder or tube (*c*) running longitudinally through or along their center and forming part of them. The space (*d*), surrounding this inner cylinder or tube of either cone and bound on the exterior by the cones which are made close, forms a conical oil or grease chamber within the cones which may be made cylindrical at their outer or larger ends where, in the periphery, on the upper side, an inlet aperture (*e*) may be provided for putting in the oil or grease, and these cylindrical ends of either cone may further be provided with an inner overlapping rim or circular ledge (*f*) which, fitting grooves in the hub, effectually prevent the escape of oil or grease past the ends of the cones—should the construction which will presently be described for establishing the circulation require the same—and which exclude dust or dirt from the bearing surface of the cones on which the hub rests and rotates, and this latter is the office in particular or exclusively of the rims or circular ledges (*f*). The cones (A), be it remembered, fitting by their inner cylinders or tubes (*c*) on the axle or shaft (B), are stationary in this arrangement, and the hub (C) rotates freely on them. Near the upper end of either cone (A) and just within the travel of the end of the hub, is a moderately sized opening or sluice (*s*), and near the smaller inner end of said cone is a smaller sized opening (*x*). These openings are arranged on the periphery of either cone and the larger opening or sluice (*s*) is above while the smaller opening (*x*) is below.

Now supposing the chambers (*d*) formed by the hollow cones to be filled or supplied with oil or grease, the said oil or grease will flow or ooze out of the small openings (*x*) on the lower side of the cones at their inner ends, and by the rotation of the hub on the cones will be gradually worked upward along and around the cones till the whole surface of the fixed conical bearing is lubricated when, by the continued rotation of the hub, as there is any tendency to a surplus of oil on the bearing, it—the oil—in arranging at or passing over the larger openings or sluices (s) at the larger ends of the cones on the upper side, will fall back through said openings or sluices (s) into the oil chambers (d), again, in its turn, to pass out of the smaller springs (x) at the other ends, and thus is a constant circulation kept up without let or hindrance or any confining passages, without any liability to clog or gum, without waste of the oil past the ends of the cones and without much chance of becoming overheated by long exposure to attrition at one time as it will be long before the same oil which has passed as surplus through the top sluices (s) will again find its way to the smaller lower openings (x) at opposite ends, and in this respect this circulating arrangement is believed to be superior to any other, the inner configuration or shape of the cones favoring a more perfect action, any heavy dirt or grit getting into the bearing, in passing through the top sluices (s), will settle or fall to the bottom of the larger ends of the cones and not be passed out again on to the bearing to injure it by cutting and so forth, while the cylindrical tubes (c) of the cones will serve to conduct the oil or grease better to the openings (x) from which it oozes to lubricate the bearing.

What I claim as new and useful in axle or journal lubricating arrangements of the conical character specified, and desire to secure by Letters Patent, is—

Constructing the cone or cones, made close, with an internal oil or grease chamber (d) round a cylinder or tube (c) forming the center part longitudinally of the cone, and providing the said cone on its periphery at opposite ends and on reverse sides with sluices or openings (s and x) essentially as and for the purposes specified.

In testimony whereof, I have hereunto subscribed my name.

WM. D. TITUS.

Witnesses:
 JOHN K. OAKLEY,
 JOHN V. LOTT.